United States Patent
Chen

(12) 
(10) Patent No.: US 6,411,511 B1
(45) Date of Patent: Jun. 25, 2002

(54) MOTHERBOARD HEAT SINK PASSAGE AND SUPPORT BOARD

(75) Inventor: Chih-chung Chen, Taipei (TW)

(73) Assignee: Portwell Inc. (TW)

( * ) Notice: Subject to any disclaimer, the term of this patent is extended or adjusted under 35 U.S.C. 154(b) by 0 days.

(21) Appl. No.: 09/951,421

(22) Filed: Sep. 14, 2001

(51) Int. Cl.⁷ ................................................ H05K 7/20
(52) U.S. Cl. ...................... 361/697; 361/687; 361/692; 361/695; 174/16.3; 165/80.3; 165/104.33; 165/185; 165/104.34; 257/721; 257/722
(58) Field of Search .................................. 361/685, 687, 361/690, 692, 695, 700–707, 709, 715, 717–719, 827; 257/706–727; 165/80.2, 80.3, 80.4, 185, 104.32, 104.33, 104.34, 121, 122, 126; 174/16.1, 16.3, 252.1; 454/184; 312/223.1, 223.2

(56) References Cited

U.S. PATENT DOCUMENTS

| | | | | |
|---|---|---|---|---|
| 5,079,438 A | * | 1/1992 | Heung .......................... 307/141 |
| 5,136,465 A | * | 8/1992 | Benck et al. ................. 361/384 |
| 5,338,214 A | * | 8/1994 | Steffes et al. ................. 439/160 |
| 5,852,547 A | * | 12/1998 | Kitlas et al. ................. 361/695 |
| 5,854,738 A | * | 12/1998 | Bowler ........................ 361/685 |
| 5,936,836 A | * | 8/1999 | Scholder ...................... 361/685 |
| 6,002,586 A | * | 12/1999 | Chen et al. ................... 361/695 |
| 6,259,600 B1 | * | 7/2001 | Talbot et al. ................ 361/687 |
| 6,282,090 B1 | * | 8/2001 | Johnson et al. .............. 361/695 |

* cited by examiner

Primary Examiner—Darren Schuberg
Assistant Examiner—Michael Datskorvsky
(74) Attorney, Agent, or Firm—Troxell Law Office PLLC

(57) ABSTRACT

An industrial computer motherboard heat sink passage and support board having one insertion piece and an opening recessed frame facing the heat sink to accommodate the heat sink on the motherboard with both wings of said recessed frame merely contacting the motherboard to form a heat sink passage; a fan at one end of the recessed frame being activated to dissipate the heat from the CPU out of the passage; and said long wings helping support the motherboard from being displaced due to weight from the heat sink disposed at the CPU, thus to prevent from damaging the slot of the backplane and the soldering point of the motherboard.

1 Claim, 3 Drawing Sheets

MOTHERBOARD HEAT SINK PASSAGE AND SUPPORT BOARD

BACKGROUND OF THE INVENTION (a) Field of the Invention

The present invention relates to an auxiliary board functioning as a heat sink passage and as a support to an industrial computer motherboard, and more particularly to one that can be plugged into a slot of a backplane of said computer. A recessed frame on said auxiliary board covers up a CPU heat sink on the motherboard having both winds of said recessed frame to merely contact the motherboard as a support to relief moment applied to the motherboard due to biased central gravity so to ensure normal operation of the CPU on the motherboard. A passage formed between the motherboard and the recessed frame for a fan provided at one end of said wings to effectively dissipate the heat from the CPU heat sink.

(b) Description of the Prior Art

As illustrated in FIG. 1, a backplane 20 is provided inside a casing 10 of an industrial computer. A plurality of slots 21 in different specifications are provided on said backplane 20 to receive plug-in by interface cards of various specifications (in this preferred embodiment of the present invention, a motherboard interface card is plugged in, and to be referred hereinafter to as the motherboard 30). A fixation guide way 111 corresponding to said slot 21 is provided on a sidewall inside said casing 10 for one end of said motherboard 30 to slide in, thus to restrict a mobile recessed frame of said motherboard 30. A standard port 31, e.g. PS/2, parallel port, serial port, USB, etc., provided on the other end of said motherboard 30 may be fixed with a screw into a through hole 121 on a rear panel 12 of the casing. However, the faster of data process signaled by CPU chip (not illustrated) on the motherboard 30, the more heat will be generated during the operation. Said heat is transmitted to a CPU heat sink 32. Therefore, higher heat dissipation efficiency is demanded on a fan 33 to avoid downtime by the computer due to overheated CPU chip. To solve this problem, usually larger capacity of the fan 33 is used to improve heat dissipation efficiency. However, the larger fan means more burden of weight in relation to the motherboard 30. As a result, after the insertion part 34 (so-called "golden finger") at the base of the motherboard is plugged into the slot 21 on the backplane 20, said CPU heat sink 32 and the fan 33 creates biased central gravity upon the motherboard 30, resulting in a bending moment to the motherboard 30. Said bending moment often causes poor contact to the slot 21 on the backplane 20, and directly strips off the solder points distributed over the electronic circuit on the motherboard 30 to affect the normal performance of the motherboard 30.

SUMMARY OF THE INVENTION

The primary purpose of the present invention is to provide an auxiliary board to support a CPU heat sink disposed at the side of a motherboard. A recessed frame comprised of a base plate and wings with said wings kept away from each other for a certain spacing with the recess facing said heat sink disposed on the motherboard. Said wings merely touching the motherboard to relieve the burden of the weight of the CPU heat sink to eliminate the possible displacement of the center gravity of the motherboard, thus to ensure normal operation of the CPU on the motherboard.

Another purpose of the present invention is to provide an auxiliary board to reduce the burden of the weight of a fan for the motherboard by having removed the fan otherwise having been fixed onto the motherboard to one end of the recessed frame of the auxiliary board.

Another purpose yet of the present invention is to provide an auxiliary board to improve heat dissipation rate for the CPU heat sink on the motherboard. To achieve the purpose, the CPU heat sink accommodated by the recessed frame forms a heat sink passage with the motherboard. Cool air from the fan disposed at one end of the recessed frame is collected for the heat transmitted from CPU chip to the CPU heat sink and can be easily driven out of the passage.

Another purpose of the present invention is to provide an auxiliary board to reduce the space occupied by the fan in the slot on the backplane. To achieve this purpose, the fan originally disposed on the CPU heat sink is moved to one end of the wings of the recessed frame. By doing so, more space in the slot is available for those interface cards that will not interfere with plug-in location.

DETAILED DESCRIPTION OF THE PREFERRED EMBODIMENTS

Figure 1:
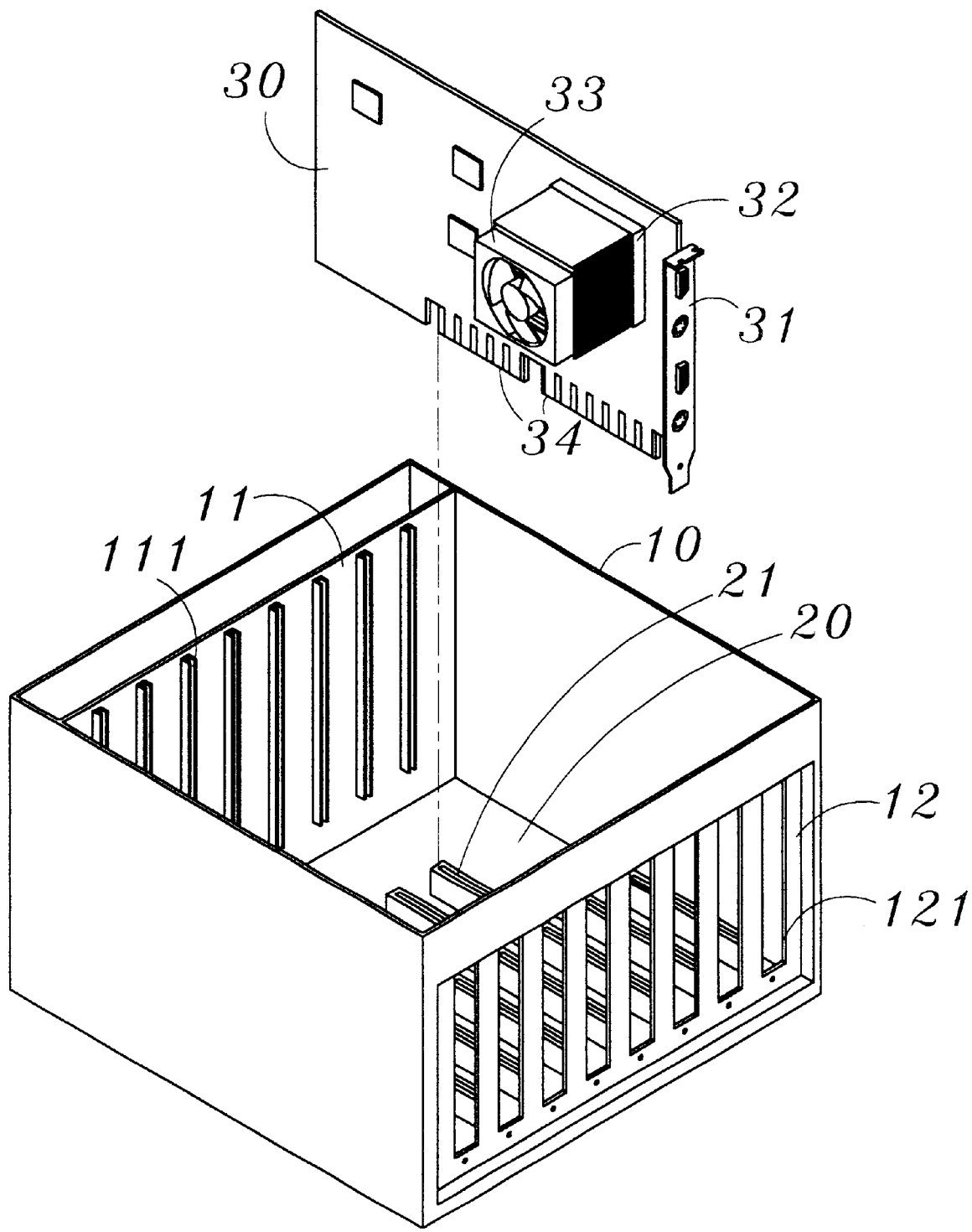
FIG. 1 is a schematic view of a motherboard of the prior art plugged into an industrial computer.
Figure 2:
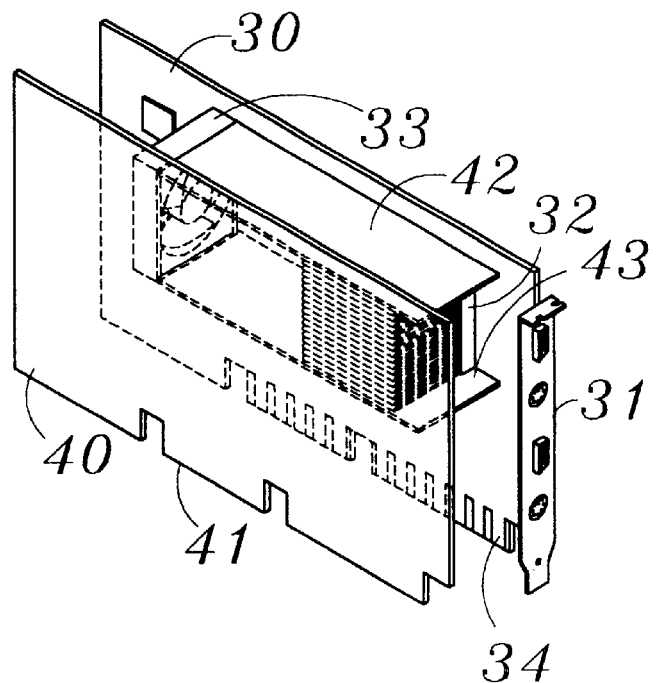
FIG. 2 is an exploded view of the present invention incorporated with the motherboard.
Figure 3:
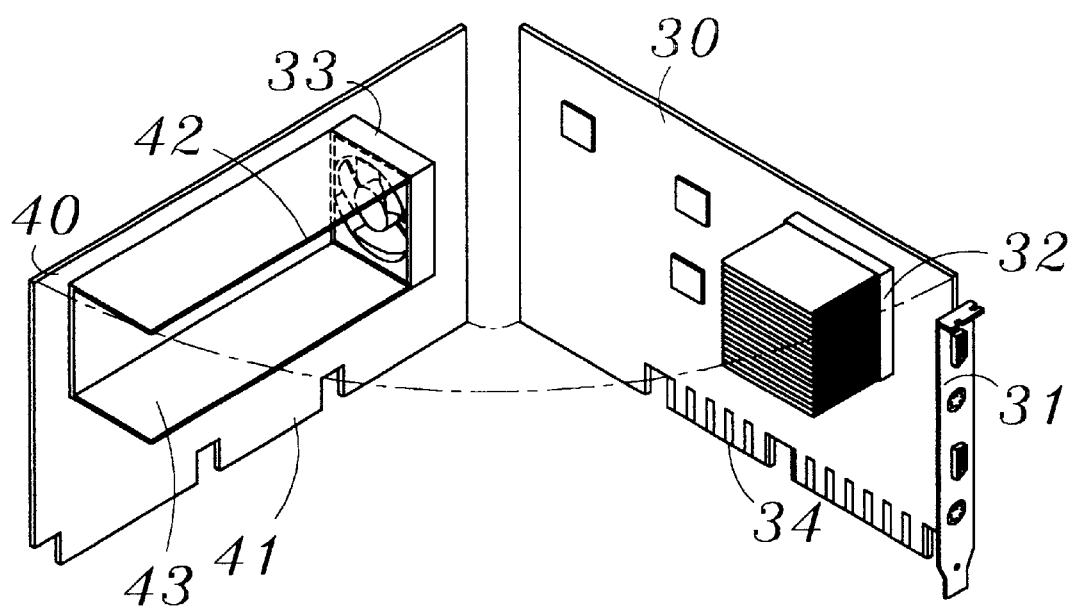
FIG. 3 is an exploded view showing that the present invention being separated from the motherboard.
Figure 4:
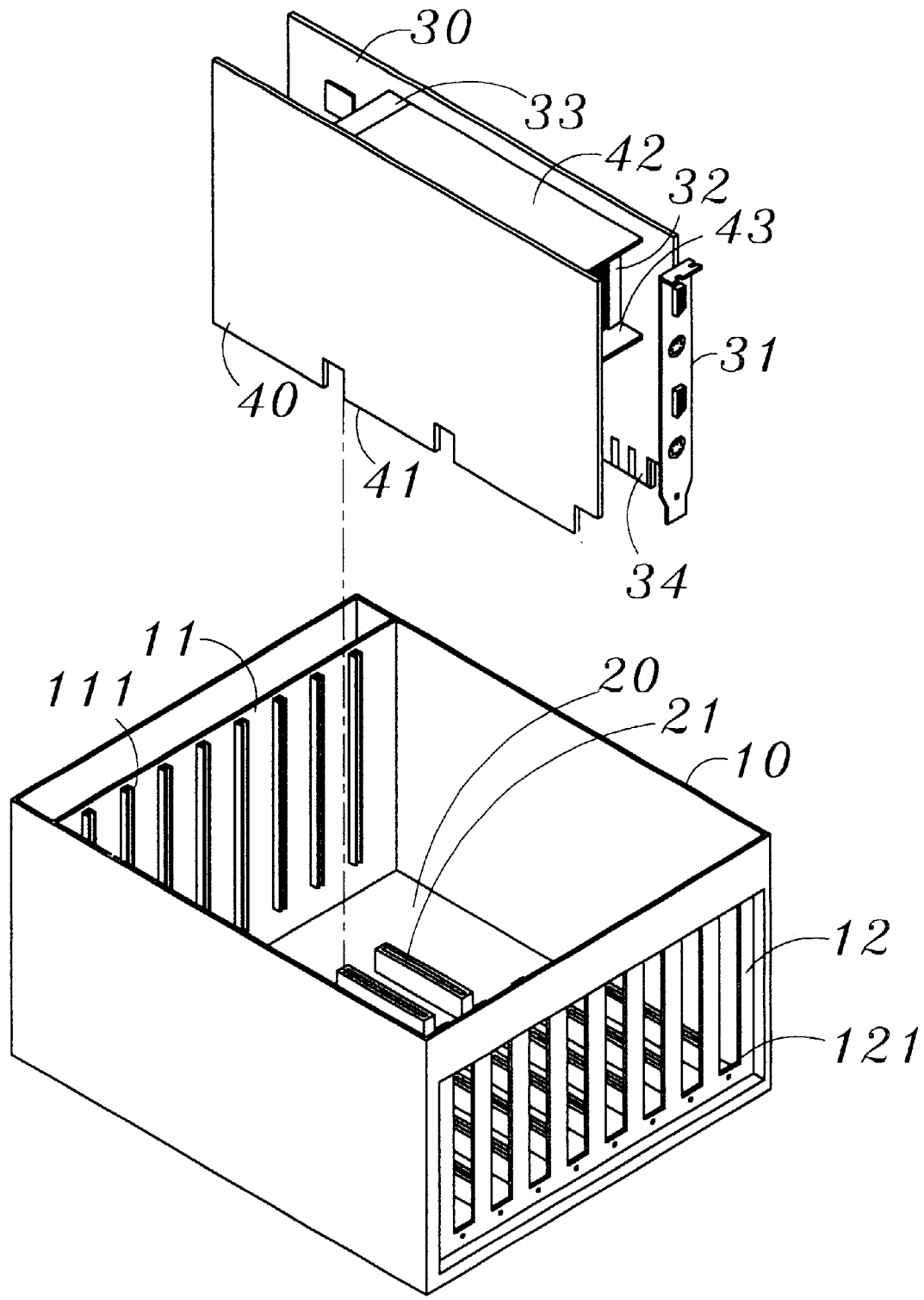
FIG. 4 is a view of a preferred embodiment of the present invention.

Referring to FIGS. 2, 3 and 4, the present invention relates to an auxiliary board 40 functioning as a heat sink passage and also as a support for an industrial computer motherboard. Adapted to a motherboard 30 provided with a CPU heat sink 32, the auxiliary board 40 on one of its longer side is provided with an insertion piece 41 of the same size as that of the golden finger from the motherboard 30. Said insertion piece 41 is merely plugged into a slot 21 on a backplane 20 inside a computer casing 10. An opening recessed frame 43 is attached to the said auxiliary board 40 to accommodate the heat sink 32 on the motherboard 30. Both wings 42 in same length vertical to the auxiliary board 40 are respectively provided on said recessed frame 43. The height of said wings 42 is kept under the spacing of the slot 21 as illustrated in FIG. 4 and a fan 33 mounted on the wing 42 is provided on one end of said recessed frame 43.

Upon installation, the heat sink 32 on the motherboard 30 is firstly accommodated between said wings 42 of the auxiliary board 40. An insertion part (so-called "golden finger") 34 of the motherboard 30 and the insertion piece 41 of the auxiliary board 40 are respectively plugged to the slot 21 next to the backplane 20. Said auxiliary board 40 and one side end of the motherboard 30 are respectively slid into a fixation guide way 111 abutted to a side wall 11 of the casing and are restricted in position by said guide way 111. A standard port 31, e.g., PS/2, parallel port, serial port and USB, is provided on the other end of the motherboard 30. Said port 31 may be fixed by screws to through holes 121 on a rear panel 12 of the casing. With the opening of the recessed frame 43 facing the side of the motherboard 30 provided with the heat sink 32, the free ends of both wings 42 of the recessed frame 43 merely contact the motherboard 30, thus to accommodate the heat sink 32 in the recessed frame 43. When both of the motherboard 30 and its heat sink 32 are supported by the wings 42 and the auxiliary board 40, the slot 21 on the backplane 20 receiving the motherboard 30 will not be damaged by biased central gravity of the CPU heat sink 32. Possible deflection of the motherboard 30 for being subject to the biased central gravity of the CPU heat sink 32 and poor contact resulted from stripped electronic circuit contacts distributed over the motherboard 30 can be also avoided. Furthermore, a heat passage formed between the motherboard 30 and the recessed frame 43 allows the heat sink 32 to dissipate the heat via the fan 33.

What is claimed is:

1. An auxiliary board functioning as a heat sink passage and a support to an industrial computer motherboard, comprising:
   an insertion piece corresponding to the form of a slot arranged on:
      a recessed frame at a given location on one side facing the motherboard,
      two wings keeping a certain spacing from each other of the recessed frame vertical to the auxiliary board, and
   a heat sink fan between the wings provided on one end of the recessed frame,
characterized by that the motherboard can be plugged to the backplane with the heat sink being accommodated by the recessed frame with free ends of the wings merely contacting the motherboard; the motherboard being supported by the wings to avoid being damaged by biased central gravity of the CPU heat sink provided thereon and to avoid poor contact of electronic circuit due to deflected motherboard.

* * * * *